United States Patent [19]
Aziz et al.

[11] Patent Number: 5,640,270
[45] Date of Patent: Jun. 17, 1997

[54] ORTHOGONAL-SCANNING MICROSCOPE OBJECTIVE FOR VERTICAL-SCANNING AND PHASE-SHIFTING INTERFEROMETRY

[75] Inventors: David J. Aziz; Bryan W. Guenther, both of Tucson, Ariz.

[73] Assignee: Wyko Corporation, Tucson, Ariz.

[21] Appl. No.: 613,462

[22] Filed: Mar. 11, 1996

[51] Int. Cl.$^6$ .......................... G02B 21/00; G02B 21/36; G02B 26/08; G01B 11/24
[52] U.S. Cl. .......................... 359/368; 359/370; 359/372; 359/234; 359/236; 359/369; 359/583; 356/345; 356/346; 356/360; 250/559.22; 250/201.3
[58] Field of Search .................... 359/368, 370, 359/372, 384, 235, 236, 234, 369, 583; 356/4.5, 345, 346, 348, 359, 360, 355; 250/559.22, 201.3

[56] References Cited

U.S. PATENT DOCUMENTS

| 4,803,352 | 2/1989 | Bierleutgeb | 250/201.3 |
| 5,390,023 | 2/1995 | Biegen | 356/359 |
| 5,469,261 | 11/1995 | Hellmuth et al. | 356/360 |

FOREIGN PATENT DOCUMENTS

| 88010 | 7/1980 | Japan | 359/369 |
| 0249938 | 10/1990 | Japan | 356/359 |
| 405196871 | 8/1993 | Japan | 250/201.3 |
| 405257064 | 10/1993 | Japan | 359/368 |
| 406082229 | 3/1994 | Japan | 356/359 |

Primary Examiner—Paul M. Dzierzynski
Assistant Examiner—Mohammad Y. Sikder
Attorney, Agent, or Firm—Antonio R. Durando

[57] ABSTRACT

A broad-bandwidth interferometric device is adapted for longitudinal insertion into a cylinder cavity to produce irradiance signals at multiple vertical-scanning positions as a function of optical path differences between a reference mirror incorporated in the probe and the cylinder-wall surface. The light-source beam is passed through an objective lens placed longitudinally in the cylinder and then divided by a beam splitter disposed in fixed relation to the cylinder wall to produce a test beam directed radially to the wall and a reference beam directed axially to a reference mirror disposed in fixed relation to the lens. During scanning, the objective lens and reference mirror are translated together, while the beam splitter remains stationary with respect to the cylinder wall, thereby varying the position of the focal point of the test beam and providing the vertical-scanning effect required to produce interference fringes and a corresponding map of the tested cylinder surface. In order to reduce the length of the instrument, the reference beam may be folded to the side by a reflective surface and the reference mirror may be positioned perpendicularly to the main axis of the instrument. In that case, the lens, fold mirror and reference mirror are all translated together, while the beam splitter remains stationary and fixed with the test surface.

27 Claims, 4 Drawing Sheets

ORTHOGONAL-SCANNING MICROSCOPE OBJECTIVE FOR VERTICAL-SCANNING AND PHASE-SHIFTING INTERFEROMETRY

BACKGROUND OF THE INVENTION

1. Field of the Invention

This invention is related in general to the field of interferometry and, in particular, to a novel device for measuring the surface roughness of cylinder walls in internal combustion engines.

2. Description of the Related Art

The surface roughness of cylinder walls in internal combustion engines is critical to good performance and durability. When the surface is too smooth, engine oil is thoroughly cleaned away by the recurring scraping action of piston rings over the cylinder walls, thereby greatly reducing lubrication to the parts and correspondingly increasing wear and tear. On the other hand, when the surface is too rough, the rings abut unevenly against the cylinder walls creating nonuniform lubricant distribution, which results in lubricant losses and nonuniform pressure distribution between the abutting surfaces, in turn also producing excessive wear and tear. In the ideal situation, the interior walls of cylinders have a very uniform surface with sufficient microscopic roughness to retain lubricant particles within uniformly-distributed recesses in the wall, such that the surface is never fully depleted of lubricant by the scraping action of the rings. Experience has shown that an average roughness of about 0.2 to 1.5 microns is desirable for standard automobile and truck internal-combustion engines.

In view of this objective, engine manufacturers inspect cylinder walls and measure their surface roughness as normal quality-control steps. The instruments used consist of borescopes, optical devices capable of showing small details of internal features, including imperfections and cracks, and stylus profilometers, mechanical devices for measuring the topography of the cylinder wall, typically with a limited three-dimensional resolution. Boroscopes are not very useful in testing for surface roughness because their resolution is not sufficient to identify problem spots; in addition, they provide a view of the cylinder wall but do not produce a quantified profile of the tested surface. The stylus instruments operate on contact, thereby affecting the tested surface, and have no ability to perform three-dimensional measurements.

Accordingly, there is a need for a better instrument for the purpose of rapidly, reliably and non-destructively measuring the roughness of cylinder walls. This invention is directed at providing a novel instrument and procedure based on non-contact interferometric principles for measuring the surface roughness of cylinder walls.

BRIEF SUMMARY OF THE INVENTION

One primary goal of this invention is an interferometer suitable for scanning a test surface placed orthogonally from, or at an angle with, the direction of motion of the scanning mechanism.

Another important object of the invention is a non-contact instrument and method for mapping the surface profile of a cylinder wall over a large scanning range, preferably up to several millimeters.

Another basic objective is a technique for cylinder walls based on optical measurements that permit higher vertical resolution than currently available with stylus-profilometry technology.

Another objective is a device and a method for measuring surface-roughness of cylinder walls more rapidly and reliably than with prior-art procedures.

Another goal is an instrument that makes it possible to obtain three-dimensional measurements of the profile of a test surface.

Finally, another goal is a method and apparatus that are suitable for implementation with relatively minor modifications to existing interferometric surface profilers.

Therefore, according to these and other objectives, the principle of interferometry, in particular vertical scanning interferometry (VSI), is applied to measuring the relative height of peaks and valleys in the surface of a cylinder wall to produce a topographic map of the tested area. The invention consists preferably of a broad-bandwidth interferometric device or probe adapted for longitudinal insertion into a cylinder cavity to produce irradiance signals at multiple vertical-scanning positions as a function of optical path differences between a reference mirror incorporated in the probe and the cylinder-wall surface. The light-source beam is passed through an objective lens placed longitudinally in the cylinder and then divided by a beam splitter disposed in fixed relation to the cylinder wall to produce a test beam directed radially to the wall and a reference beam directed axially to a reference mirror disposed in fixed relation to the lens. During scanning, the objective lens and reference mirror are translated together, while the beam splitter remains stationary with respect to the cylinder wall, thereby varying the position of the focal point of the test beam and providing the vertical-scanning effect required to produce interference fringes and a corresponding map of the tested cylinder surface. In order to reduce the length of the instrument, the reference beam may be folded to the side by a reflective surface and the reference mirror may be positioned perpendicularly to the main axis of the instrument. In that case, the lens, fold mirror and reference mirror are all translated together, while the beam splitter remains stationary and fixed with respect to the test surface.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The heart of this invention lies in the recognition that vertical-scanning interferometry can be performed on the surface of the interior wall of an internal-combustion cylinder by modifying a conventional interference microscope objective so that the objective lens and the reference mirror are translated together along the optical axis in the longitudinal direction of the cylinder, while the beam splitter is kept stationary with respect to the test surface, that is, the cylinder wall, which is disposed orthogonally to the direction of scanning. Such configuration results in vertical scanning of the wall surface even though no radial movement occurs within the cylinder.

The invention is applicable to both vertical scanning-interferometry (VSI) and phase-shifting interferometry (PSI), but it is mostly practical only when a rough surface is being measured; that is, when VSI is the suitable interferometric method. Therefore, the invention will be described in terms of vertical-scanning interferometry but it is understood that it should not be so limited.

Vertical scanning interferometry is a technique where broad bandwidth light, such as white light, is used as a light source in an interferometer and the degree of modulation, or contrast, of interference fringes produced by the instrument is measured for various distances between a test surface and the reference surface of the interferometer (each distance corresponding to a different optical path difference, OPD) to determine surface height. The method typically involves vertical scanning of a reference arm of the interferometer with respect to a stationary sample and calculation of the relative modulation of the intensity signal as a function of vertical position.

Figure 1:
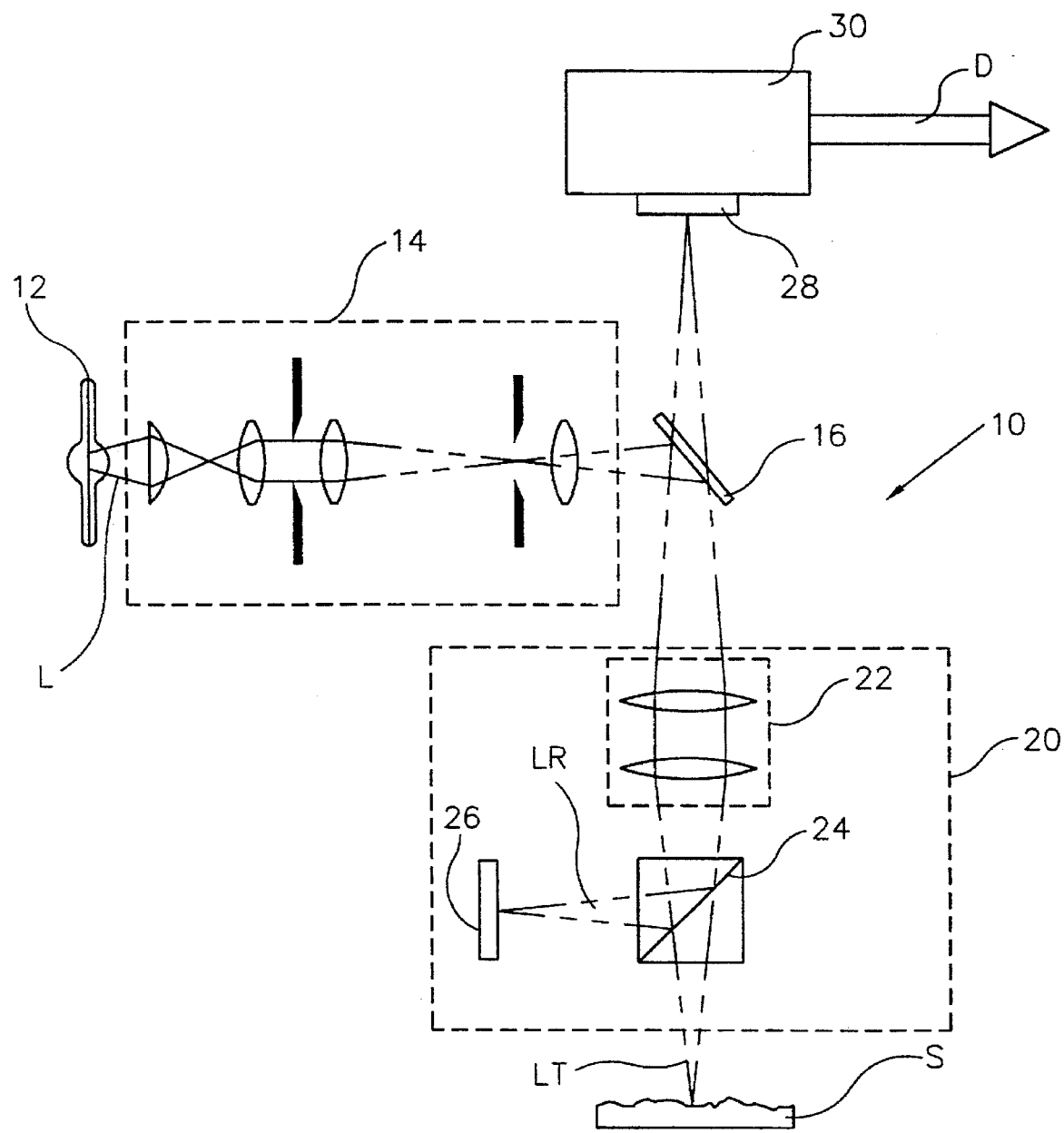
FIG. 1 is a simplified schematic representation of a conventional vertical-scanning interferometer.

As illustrated in simple schematic form in FIG. 1, typical interferometric equipment 10 comprises a light source 12 directing a beam L of light through an illuminator 14 toward a beam splitter 16, which reflects the light downward in the direction of a test surface S. The light reflected by the beam splitter 16 passes through an objective lens 22 focused on the test surface S. The objective lens 22, a beam splitter 24 and a reference mirror together 26 constitute an interference microscope assembly 20 adapted for relative movement with respect to the test surface, so that two light beams LR and LT are generated for producing interference fringes. The reference beam LR is focused on the surface of the reference surface 26, while the test beam LT is focused on the test or sample surface S. Note that the test beam LT is shown for simplicity as coaxial with the optical axis of the objective lens 22, but in practice it may be shifted either by design or by optics imperfections to a parallel or slightly angular position by the beam splitter 24, as would be obvious to one skilled in the art. The beams reflected from the reference mirror 26 and the test surface S pass back up through the optics of the objective lens 22 and upward through the beam splitter 16 to a solid-state detector array 28 in a camera 30 in coaxial alignment with the objective 22, so that two light beams produce interference fringes as a result of the optical path difference between the reference mirror and the test surface S. The imaging array 28 normally consists of individual charge-coupled-device (CCD) cells or other sensing apparatus adapted to detect and record a two-dimensional array of signals corresponding to interference effects produced by the interferometer as a result of light reflected at individual x-y-coordinate pixels in the surface S and received at corresponding individual cells in the array. Appropriate electronic hardware is provided to process the signals generated by each cell and transmit digitized light-intensity data D to a microprocessor for processing. The reference arm 20, containing the microscope objective 22, beam splitter 24 and reference surface 26 incorporated within it, is adapted for vertical movement (along the z coordinate) to focus the image of the sample surface S on the detector array 28. Thus, an interference-fringe map is generated by detecting the intensity of the light signal received in each cell of the array 28.

In conventional vertical-scanning interferometry, a profile of the surface S is produced by repeating irradiance measurements at different, normally constant-interval OPD's between the microscope objective 20 and the test surface S (that is, at different elevations of the scanning unit), so as to provide information concerning the variation of light intensity at each pixel as the corresponding optical path difference is varied systematically with respect to an initial reference point. Thus, the position of the scanning unit corresponding to maximum interference at each pixel is determined and used, based on the distance from the reference point, to calculate the height of the surface at that pixel. Either the interference microscope assembly 20 or the test surface S is moved vertically (vertical scanning) to produce these repeated measurements. It is noted that this type of interference microscope conforms to the configuration of a special type of Michelson interferometer.

The prior art discloses various ways by which VSI may be implemented to determine surface height by calculating the degree of fringe modulation, or contrast, of the interference fringes produced at the light detector for various OPD's between the test surface and the reference surface of the interferometer. All methods involve vertical scanning of the interference microscope assembly (or its equivalent components, in the case of other types of interferometers) with respect to a stationary sample, or viceversa. The components of the interference microscope objective 20 (lens 22, beam splitter 24 and reference mirror 26) are kept in fixed relation and move together to maintain a fixed focused optical path to the reference mirror while the sample S is scanned. This arrangement allows large vertical scans (in the order of hundreds of microns, up to several millimeters, depending on the scanning mechanism utilized); this scanning range ensures that different portions of the sample S, successively appearing within the focal depth of the lens 22, produce observable interference fringes during the entire scan.

Figure 2:
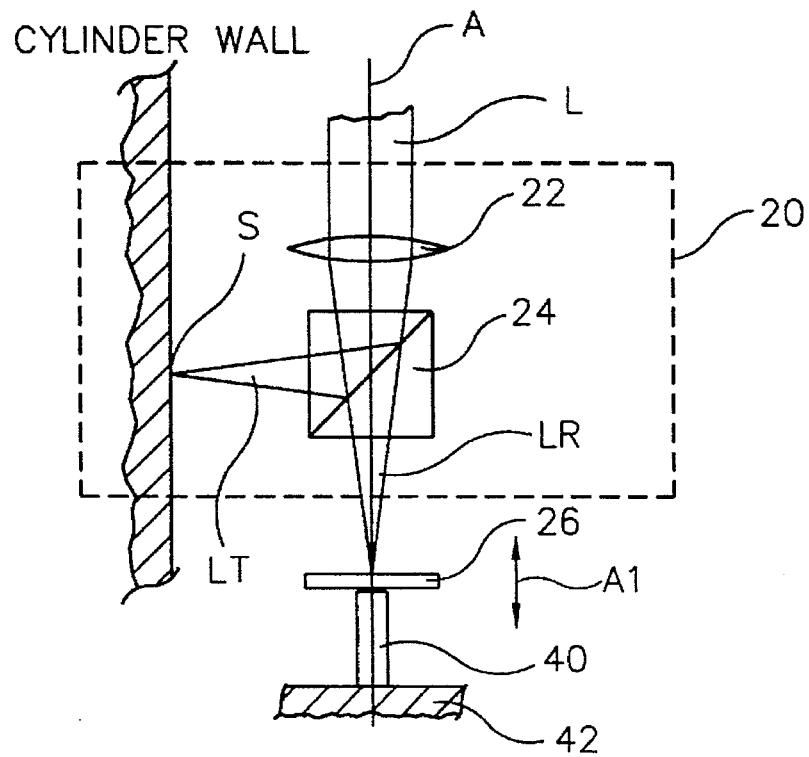
FIG. 2 is a schematic representation of the interference microscope objective portion of a cylinder-bore scanner according to one embodiment of the present invention, wherein the reference mirror is translated vertically to perform vertical-scanning interferometric measurements on a stationary cylinder wall placed at right angle to the axis of the stationary objective lens and beam splitter.

In order to measure the roughness of a cylinder wall with an interferometric device adapted to scan vertically along the cylinder's main axis and test a surface disposed orthogonally thereto, the positions of the test and reference surfaces in FIG. 1 necessarily would have to be inverted, as shown in the schematic view of FIG. 2, to reflect the coaxial position of the cylinder wall with respect to the optical axis A of the objective lens 22. According to one aspect of the present invention, such a configuration (shown for simplicity with a single objective lens 22 receiving collimated light L) could be used to perform vertical scanning interferometry by translating the reference surface 26 in the direction of arrows A1 along the optical axis of the objective lens using a scanning mechanism 40 fixedly mounted on a support surface 42, but the scanning range of such a device would be limited to a fraction of the depth of focus of the lens 22. When scanning outside the focal depth, in practice no useful fringes are produced because the vertical resolution is greatly degraded. Therefore, while viable as a solution for measuring a relatively smooth surface (for example, an F/4 objective lens will provide a useful scanning range of about 10 microns with visible light), the configuration of FIG. 2 is not practical for cylinder walls with greater peak-to-valley roughness.

Figure 3:
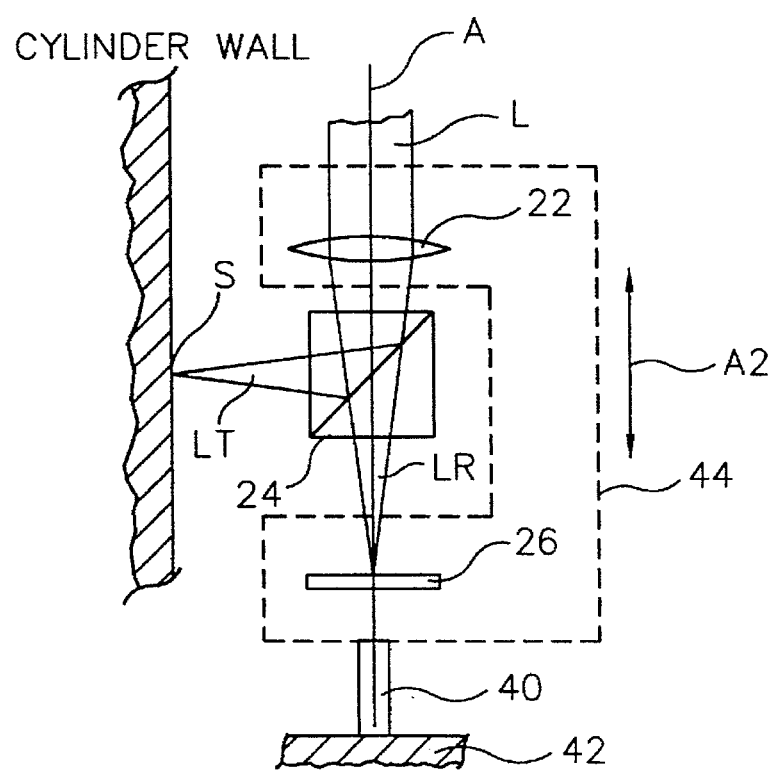
FIG. 3 is a schematic representation of the interference microscope objective portion of a cylinder-bore scanner according to the preferred embodiment of the present invention, wherein the objective lens and reference mirror are translated vertically to perform vertical-scanning interferometric measurements on a stationary cylinder wall placed at right angle to the axis of the objective lens through a stationary beam splitter.

The main aspect of the present invention concerns the idea of performing vertical scanning by translating the objective lens 22 and the reference mirror 26 together, while keeping the beam splitter 24 fixed with respect to the test surface S (i.e., with respect to the cylinder wall). As shown in the schematic representation of FIG. 3, the objective-lens/mirror assembly 44 is translated in the direction of arrows A2 along the optical axis of the objective lens using a scanning mechanism 40 fixedly mounted on a support surface 42. Because of the fixed distance between the lens 22 and the reference mirror 26, the mirror remains in focus during the entire range of translation. At the same time, as the distance between the lens 22 and the splitter 24 varies, so will the position of the focal plane of the test beam LT, thereby providing a variable OPD for producing fringes during scanning.

Figure 4:
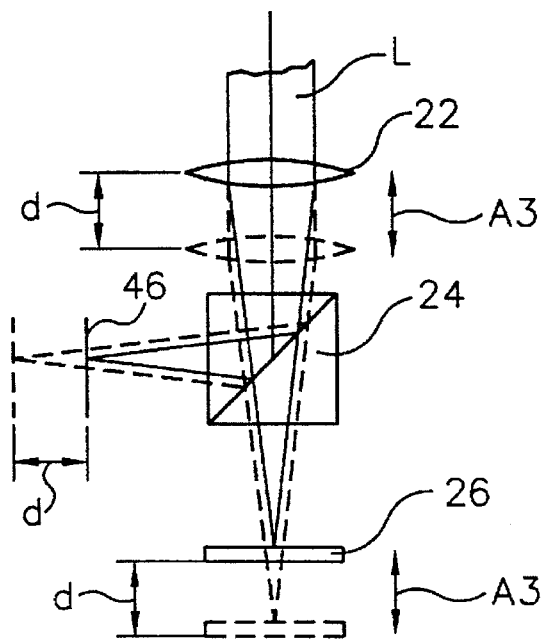
FIG. 4 is a schematic representation of the optical effect of scanning the device of FIG. 3.

FIG. 4 illustrates the effect of the simultaneous and equal translation of the objective lens 22 and the reference mirror 26 along the direction of arrows A3. The initial position, shown in solid line, results in a test focal plane 46 determined by the initial distance between the lens and the beam splitter 24. As the lens 22 is moved closer to the splitter 24 by a distance d (the result is shown in broken line), the reference mirror 26 remains in the reference focal plane because the distance between the lens and the mirror is unchanged, but the test focal plane is shifted away. Thus, during the translation corresponding to the two lens and reference mirror positions indicated in FIG. 4, the focal plane of the test beam travels through the same distance d and successively produces interference fringes corresponding to points found in focus on the scanned surface. Therefore, the scanning range can be extended as needed to cover the roughness of the sample surface.

According to this principle, the preferred embodiment of the present invention consists of an interferometric probe adapted for longitudinal insertion in the cavity of a cylinder and comprising a microscope objective lens and a reference surface disposed in fixed relation to one another and adapted to translate together along the cylinder's axis during vertical scanning. The probe also comprises a stationary beam splitter to produce a test beam projecting radially (orthogonally to the optical axis of the objective lens) and focused on the cylinder wall. In operation, the probe of the invention is inserted longitudinally into the cavity of a cylinder such that the optical axis of the objective lens 22 is parallel to the main axis of the cylinder. As would be obvious to those skilled in the art of interferometry, the probe must be rigidly secured to a supporting structure so that its position relative to the target surface can be finely adjusted. The probe is placed in such a way that the target surface on the wall of the cylinder is within the focal depth of the test beam LT. Conventional VSI is then carried out by translating the objective-lens/mirror assembly 44 in the direction of arrows A2 (FIG. 3) and the relative height of each surface pixel is measured by estimating the peak of the corresponding modulation envelope from the intensity measurements collected during scanning. Note that the curvature of the test surface (the internal wall of a cylinder) is accounted for and eliminated by appropriate software that is conventionally used when interferometric measurements are performed on curved surfaces. It is also noted that the interferometric arrangement of FIG. 3 can be used for phase-shifting measurements as well when a smooth surface is being tested. In such cases, though, conventional configurations would be just as effective and probably preferred.

As those skilled in the art would readily understand, the concept of this invention could be applied as well in a system where the test beam is projected at an angle (which may or may not be 90 degrees) from the optical axis A of the objective lens and from the scanning direction of the interferometer, and where the test beam is then focused on a test surface placed perpendicularly to the test beam. The principles of the invention apply to any such configuration as well because a vertical translation of the objective-lens/mirror assembly 44 in the direction of arrows A2 will produce the same amount of translation of the focal plane 46 along the test beam's axis, such that height measurements can be made of a test surface lying within that plane. In practice, though, if the angle between the optical axis of the objective lens and the test beam is small (measured with respect to the direction of the lens' focal point), the test and reference surfaces will be too close to each other for practical implementation. In addition, the beam splitter would have to be very large to reflect the test beam at a small angle with respect to the reference beam. If the angle is large, the test beam will be reflected back toward the objective lens, with comparable undesirable effects. Therefore, for optimal performance the test beam should be close to orthogonal to the optical axis of the objective lens. In practice, it is expected that any angle between about 25 and 155 degrees could be implemented in a straightforward manner for most applications. Smaller and larger angles would require special design configurations that may be harder to implement and, therefore, not preferred.

The concept of the invention could also be implemented by directing the reference beam LR out of the beam splitter 24 at an angle with respect to the optical axis A of the objective lens 22. This configuration would require coordinating the translation of the objective lens and of reference mirror in such a way that the reference mirror would remain in focus throughout the scanning procedure, while the beam splitter would remain stationary. As well understood in the art, this could be accomplished by translating the objective lens and the reference mirror vertically by different amounts (the relative motion would depend on the geometry and optical characteristics of the beam splitter), or by translating each along its respective axis by the same amount. The relationship between the vertical movement of the objective lens and the vertical movement of the reference beam's focal plane is a function of the structural configuration of the beam splitter 24 and is well understood in the art. Accordingly, appropriate correction would be made as a function of the angle between the reference beam and the optical axis of the objective lens to account for the proportionate (but unequal) vertical displacement of the focal plane with respect to that of the objective lens. Note that the term "vertical" is used here to indicate the direction of scanning of the interferometer, but any other scanning direction would be equivalent for the purposes of this invention.

Figure 5:
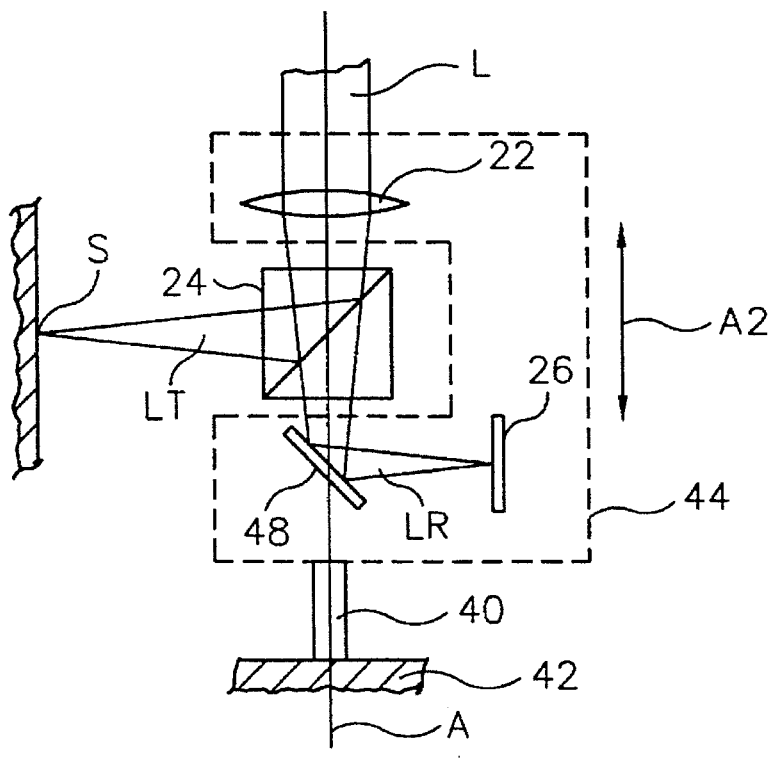
FIG. 5 is a variation of the device of FIG. 3 comprising a fold mirror reflecting the reference beam to the side of the objective's optical axis in order to shorten the length of the instrument.

FIG. 5 illustrates a refinement of the concept of the present invention which may be preferred for applications where the length of the probe is crucial and needs to be as compact as possible to conform to limited space requirements. In order to shorten the tip of the probe, a fold mirror 48 is placed within the reference beam LR to divert it to the side (preferably, but not necessarily, at 90 degrees). This allows the placement of the reference mirror 26 at the focal length in a direction appropriate for shortening the physical length of the probe. Obviously, this embodiment of the invention is optically equivalent to the one illustrated in FIG. 3.

Figure 6:
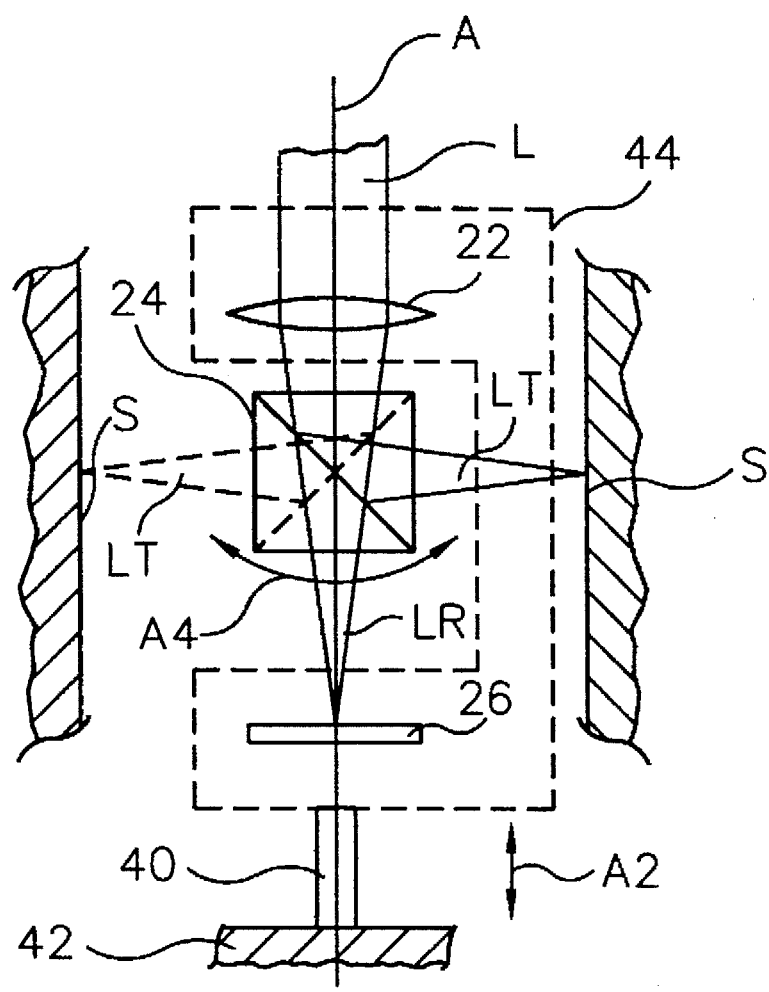
FIG. 6 is another variation of the device of FIG. 3, wherein the bean splitter is rotatable about the optical axis of the instrument, thereby enabling it to view and test sample surfaces in all radial directions.

In still another embodiment of the invention illustrated schematically in FIG. 6, the beam splitter 24, which is stationary along the optical axis A of the objective lens 22, is made rotatable around such axis (arrows A4) so as to provide flexibility with respect to the radial direction of the test beam LT. This feature enables use of the probe of the invention to project the test beam in any direction on a plane perpendicular to the lens' optical axis and scan any surface placed in parallel to the probe. For example, it can be used to test the entire circumference of the inside wall of a cylinder, as shown in the figure where dotted and solid lines correspond to two alternative positions of the beam splitter 24. Note that this feature is illustrated in FIG. 6 with reference to the embodiment of FIG. 3, but it could be implemented in equivalent fashion with the probe of FIG. 5.

Thus, the present invention exploits the optical effect of translating a microscope objective lens and a reference mirror together along the lens' optical axis while maintaining a beam splitter in stationary position to reflect the test beam radially therefrom to carry out vertical scanning interferometry on a test surface disposed in parallel to the direction of scanning. This procedure is not limited by the focal depth of the objective lens and, therefore, it can be implemented over a wide scanning range, constrained only by the characteristics of the mechanism utilized to effect the scanning translation. With the motorized devices recently introduced in the art, the present invention has been used over a scanning range of about one millimeter and it is expected that VSI will soon be carried out reliably over a scanning of several millimeters.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. In a device for executing interferometric measurements at multiple distances between a reference surface and a test surface disposed in aligned optical paths to a light-intensity sensor, wherein a scanning means is used to effect a relative translation between the reference surface and the test surface to achieve said multiple distances at which light-intensity outputs are produced, wherein said light-intensity outputs are used to calculate a surface-height output corresponding to a profile of the test surface, and wherein the test surface is disposed orthogonally to a direction forming a first angle with a scanning direction of the interferometer, an interference microscope that comprises:

(a) an objective lens having an optical axis and a focal plane;

(b) a beam splitter aligned with the optical axis of the objective lens, said beam splitter producing a reference beam and producing a test beam directed substantially along said direction forming a first angle with the scanning direction of the interferometer and toward said test surface placed substantially within the focal plane of said test beam;

(c) a reference surface disposed substantially within the focal plane of said reference beam; and (d) scanning means for translating the objective lens and the reference surface together while the beam splitter and test surface remain stationary.

2. The device of claim 1, wherein said beam splitter is rotatable around said optical axis.

3. The device of claim 1, wherein said first angle is substantially 90 degrees.

4. The device of claim 2, wherein said first angle is substantially 90 degrees.

5. The device of claim 1, further comprising a fold mirror placed between the beam splitter and the reference surface in fixed relation to the objective lens to divert the reference beam toward a direction at a second angle with said optical axis of the objective lens.

6. The device of claim 5, wherein said first angle is substantially 90 degrees.

7. The device of claim 5, wherein said second angle is substantially 90 degrees.

8. The device of claim 5, wherein said first angle is substantially 90 degrees and said second angle is substantially 90 degrees.

9. The device of claim 5, wherein said beam splitter is rotatable around said optical axis.

10. The device of claim 9, wherein said first angle is substantially 90 degrees.

11. The device of claim 9, wherein said second angle is substantially 90 degrees.

12. The device of claim 9, wherein said first angle is substantially 90 degrees and said second angle is substantially 90 degrees.

13. In a device for executing interferometric measurements at multiple distances between a reference surface and a test surface disposed in aligned optical paths to a light-intensity sensor, wherein a scanning means is used to effect a relative translation between the reference surface and the test surface to achieve said multiple distances at which light-intensity outputs are produced, wherein said light-intensity outputs are used to calculate a surface-height output corresponding to a profile of the test surface, and wherein the test surface is disposed orthogonally to a scanning direction of the interferometer, an interference microscope that comprises:

(a) an objective lens having an optical axis and a focal plane;

(b) a beam splitter aligned with the optical axis of the objective lens, said beam splitter producing a reference beam directed substantially along said optical axis and producing a test beam directed substantially along said direction forming a first angle with the scanning direction of the interferometer and toward said test surface placed substantially within the focal plane of said test beam;

(c) a reference surface disposed in fixed relation to the objective lens and substantially within the focal plane of said reference beam; and (d) scanning means for translating the objective lens and the reference surface together along said optical axis while the beam splitter and test surface remain stationary.

14. A method of executing interferometric measurements at multiple distances between a reference surface and a test surface disposed in aligned optical paths to a light-intensity sensor, wherein a scanning means is used to effect a relative translation between the reference surface and the test surface to achieve said multiple distances at which light-intensity outputs are produced, wherein said light-intensity outputs are used to calculate a surface-height output corresponding to a profile of the test surface, and wherein the test surface is disposed orthogonally to a direction forming a first angle with a scanning direction of the interferometer, said method comprising the following steps:

(a) providing an objective lens having an optical axis and a focal plane;

(b) providing a beam splitter aligned with the optical axis of the objective lens and adapted to produce a reference beam directed along said optical axis and a test beam directed along said direction forming a first angle with the scanning direction of the interferometer toward said test surface;

(c) providing a reference surface disposed in fixed relation to the objective lens and substantially within the focal plane of said reference beam;

(d) providing scanning means for translating the objective lens and reference surface together along said optical axis;

(e) placing a test surface substantially within the focal plane of said test beam; and (f) translating said objective lens and reference surface together along said optical axis to perform interferometric measurements while the beam splitter and test surface remain stationary.

15. The method of claim 14, wherein said first angle is substantially 90 degrees.

16. The method of claim 14, wherein said beam splitter is rotatable around said optical axis.

17. The method of claim 16, wherein said first angle is substantially 90 degrees.

18. The method of claim 14, wherein said step (c) further comprises providing a fold mirror placed between the beam splitter and the reference surface in fixed relation to the objective lens to divert the reference beam toward a direction at a second angle with said optical axis of the objective lens; and wherein said step (f) further comprises translating the fold mirror together with the objective lens and the reference surface.

19. The method of claim 18, wherein said first angle is substantially 90 degrees.

20. The method of claim 18, wherein said second angle is substantially 90 degrees.

21. The method of claim 18, wherein said first angle is substantially 90 degrees and said second angle is substantially 90 degrees.

22. The method of claim 18, wherein said beam splitter is rotatable around said optical axis.

23. The method of claim 22, wherein said first angle is substantially 90 degrees.

24. The method of claim 22, wherein said second angle is substantially 90 degrees.

25. The method of claim 22, wherein said first angle is substantially 90 degrees and said second angle is substantially 90 degrees.

26. A method of executing vertical-scanning interferometric measurements at multiple distances between a reference surface and a test surface disposed in aligned optical paths to a light-intensity sensor, wherein a scanning means is used to effect a relative translation between the reference surface and the test surface to achieve said multiple distances at which light-intensity outputs are produced, wherein said light-intensity outputs are used to calculate a surface-height output corresponding to a profile of the test surface, and wherein the test surface is disposed in parallel to the scanning direction of the interferometer, said method comprising the following steps:

(a) providing an objective lens having an optical axis and a focal plane;

(b) providing a beam splitter disposed in fixed relation to the objective lens, aligned with the optical axis thereof, and adapted to produce a reference beam directed along said optical axis and a test beam directed radially from the optical axis toward a test surface;

(c) providing a reference surface substantially within the focal plane of said reference beam;

(d) providing scanning means for translating the reference surface along said optical axis; and (e) placing a test surface substantially within the focal plane of said test beam; and (f) translating said reference surface along said optical axis to perform vertical-scanning while the objective lens and the beam splitter remain stationary.

27. The method of claim 26, wherein said beam splitter is rotatable around said optical axis.

* * * * *